(12) United States Patent
David et al.

(10) Patent No.: US 9,567,406 B2
(45) Date of Patent: *Feb. 14, 2017

(54) METHOD FOR OBTAINING AN ELONGATE POLYSACCHARIDE ELEMENT, IN PARTICULAR A CHITOSAN THREAD

(75) Inventors: Laurent David, Lyons (FR); Alexandra Montembault, Saint Etienne (FR); Mylène Desorme, Saint Martin la Plaine (FR)

(73) Assignees: LABORATOIRE TETRA MEDICAL, Annonay (FR); CENTRE NATIONAL DE LA RECHERCHE SCIENTIFIQUE, Paris (FR); UNIVERSITE CLAUDE BERNARD LYON I, Villeurbanne (FR)

(*) Notice: Subject to any disclaimer, the term of this patent is extended or adjusted under 35 U.S.C. 154(b) by 1075 days.

This patent is subject to a terminal disclaimer.

(21) Appl. No.: 13/582,537

(22) PCT Filed: Mar. 4, 2011

(86) PCT No.: PCT/FR2011/050453
§ 371 (c)(1),
(2), (4) Date: Feb. 14, 2013

(87) PCT Pub. No.: WO2011/107719
PCT Pub. Date: Sep. 9, 2011

(65) Prior Publication Data
US 2013/0252498 A1   Sep. 26, 2013

(30) Foreign Application Priority Data
Mar. 5, 2010  (FR) ...................................... 10 51640

(51) Int. Cl.
*D01F 9/00* (2006.01)
*C08B 37/00* (2006.01)
(Continued)

(52) U.S. Cl.
CPC ............ *C08B 37/0024* (2013.01); *B32B 27/02* (2013.01); *D01D 5/06* (2013.01); *D01F 9/00* (2013.01);
(Continued)

(58) Field of Classification Search
CPC ........ C08B 37/0024; B32B 27/02; D01F 9/00; D01F 9/04; D01D 5/06; Y10T 442/431; Y10T 428/2975
See application file for complete search history.

(56) References Cited

U.S. PATENT DOCUMENTS

| 9,238,880 B2 * | 1/2016 | Domard | ................... D01D 5/06 |
| 2012/0022242 A1 * | 1/2012 | Domard | ................... D01D 5/06 536/20 |

FOREIGN PATENT DOCUMENTS

| FR | WO 2010094879 A1 * | 8/2010 | ............... D01D 5/06 |
| JP | 04-119121 | 4/1992 | |

(Continued)

OTHER PUBLICATIONS

K. Okuyama et al., "Structural diversity . . . its complexes" Carbohydrate Polymers, 41, (2000) pp. 237-247.
(Continued)

*Primary Examiner* — Galen Hauth
(74) *Attorney, Agent, or Firm* — Clark & Brody

(57) ABSTRACT

A method for obtaining an elongate polysaccharide element, in particular a chitosan thread, includes extruding a hydroalcoholic extrusible solution containing a polyalcohol of said polysaccharide through an extrusion die, coagulating the extruded solution by neutralization, and at least one operation of removing the polyalcohol. The ratio of water to polyalcohol in the extrusible solution is determined such as to obtain in the elongate element a polysaccharide with the crystalline structure thereof mainly in the form of an anhy-
(Continued)

drous allomorph. Since the polysaccharide used to prepare the extrusible solution has a weight-average molar mass $Mw0$, the polysaccharide in the elongate element obtained preferably has a weight-average molar mass $Mw1$ comprised between $Mw0$ and $0.7 Mw0$. Since the purpose is to obtain a chitosan thread, the latter has properties of mechanical strength and flexibility that allow the thread to be tied into overhand knots and to be woven without breaking.

6 Claims, 4 Drawing Sheets

(51) Int. Cl.
    *D01D 5/06* (2006.01)
    *D01F 9/04* (2006.01)
    *B32B 27/02* (2006.01)
(52) U.S. Cl.
    CPC ............ *D01F 9/04* (2013.01); *Y10T 428/2975* (2015.01); *Y10T 442/431* (2015.04)

(56) References Cited

FOREIGN PATENT DOCUMENTS

| WO | 97/30093 | 8/1997 |
| WO | 2005/025520 | 3/2005 |

OTHER PUBLICATIONS

A. Montembault et al., "Physico-chemical studies . . . hydroalcoholic medium", Biomaterials 26 (2005) pp. 933-943.
K. Ogawa, "Effect of . . . and Polymorphs", Agric. Biol. Chem. 55(9), pp. 2375-2379, 1991.
East G.C. et al., "Wet Spinning . . . Chitosan Fibers", Jouranl of Applied Polymer Science, John Wiley and Sons Inc., NY, USA, vol. 50, No. 10, Dec. 10, 1993, pp. 1773-1779, XP000464421.
Notin L. et al., "Morphology and . . . and ageing", Acta Biomaterialia, vo. 2, No. 4, pp. 387-402, Jul. 1, 2006, XP025150238.

* cited by examiner

METHOD FOR OBTAINING AN ELONGATE POLYSACCHARIDE ELEMENT, IN PARTICULAR A CHITOSAN THREAD

The present invention relates to the production, by extrusion, of an, elongate polysaccharide element; it relates in particular to the spinning of chitosan.

Chitosan is a deacetylated derivative of chitin. It is a linear copolymer made up of the distribution, most commonly random, of D-glucosamine (deacetylated residue or unit) and of N-acetyl-D-glucosamine (acetylated residue or unit) linked together by $\beta$-(1→4) glycosidic bonds. Chitosan is biodegradable and biocompatible. Generally, it is also bioactive, in particular hypocholesterolemic, bacteriostatic, fungistatic and live-tissue regenerating. Owing to these properties, it is naturally of interest in the cosmetics, dietetics, pharmaceutical and biomaterials fields.

The most widely used technique for spinning chitosan is wet spinning (George C. East and Yimin Qin, Wet spinning of chitosan and the acetylation of chitosan fibers, Journal of Applied Polymer Science, 1993, 50 (10), 1773-9); it consists in preparing a chitosan collodion by putting chitosan into aqueous solution in a dilute acidic medium, in particular acetic acid, in extruding said collodion through a spinneret into an alkaline coagulation bath, generally a solution of sodium hydroxide, of potassium hydroxide or of ammonium hydroxide, and in washing, drying and then winding the coagulated filament obtained. The acid in the collodion is in a stoichiometric amount relative to the amine functions of the chitosan, such that dissolution of the chitosan is obtained by virtue of the protonation of the amine functions of the glucosamine unit. During the extrusion of the collodion into the alkaline bath, in particular of sodium hydroxide, of potassium hydroxide or of an ammonium hydroxide solution, the amine function is deprotonated, thereby causing precipitation of the chitosan and the formation of a salt, in particular of sodium acetate, potassium acetate or ammonium acetate, said salt subsequently being eliminated during the washing step.

Document EP 1 670 418 proposes a spinning technique which differs from the above in that the coagulating agent is no longer an alkaline solution but an alkaline gas, in particular ammonia. This dry spinning technique makes it possible to eliminate all the aqueous media at the spinneret outlet, including the washing baths. This is because, given that the ammonium acetate salt formed inside the filaments during coagulation in the presence of the ammonia gas is readily hydrolyzed to acetic acid and ammonia, total or partial elimination thereof has been possible by the setting up of a moist hot air drying system which makes it possible to replace the washing/drying steps of the conventional wet spinning process. It should be noted that it may, moreover, be advantageous to maintain a certain presence of residual salts for some applications owing to the fact that this presence controls the fiber swelling properties in a strongly hydrated medium.

The subject of the present invention is a novel method for producing an elongate polysaccharide element which differs from the two abovementioned techniques and which makes it possible to obtain a large fraction of anhydrous allomorph in the filament obtained, which fraction is greater than or equal to 40%, preferably greater than or equal to 50%. In a known manner, this method comprises an operation of extruding an extrudable solution of said polysaccharide through an extrusion spinneret and an operation of coagulating the extruded solution by neutralization.

It is understood, within the context of the present invention, that when the anhydrous allomorph is predominantly obtained in the yarn, the fraction thereof is greater than or equal to 40%, preferably greater than or equal to 0%.

Characteristically, the extrudable solution is an aqueous-alcoholic solution containing a polyalcohol, and the method comprises at least one operation of eliminating the alcohol contained in the extruded and coagulated element in order to obtain the elongate polysaccharide element and the proportion of water and of polyalcohol in the extrudable solution is determined so as to obtain in the elongate element a polysaccharide having a crystalline structure that is predominantly in the form of the anhydrous allomorph.

Preferably, the aqueous-alcoholic solution comprises a water/polyalcohol ratio, by weight, for which the proportion of polyalcohol is predominant relative to the water.

The alcohol contained in the aqueous-alcoholic extrudable solution is necessarily a polyalcohol, especially a diol or a triol. It cannot be a monoalcohol, such as methanol, ethanol or propanol. This is because it is important that the alcohol used does not precipitate the solution, which a monoalcohol would risk doing, but on the contrary keeps the collodion in the solution state and that this solution remains homogeneous. It is preferably chosen from the group: 1,2- and 1,3-propanediol, 1,2-, 1,3- and 1,4-butanediol, and 1,2,3-propanetriol (glycerol).

Unexpectedly, the elongate element obtained from the aqueous-alcoholic polysaccharide solution of the present invention, formed from a polyalcohol, has a particular crystalline structure, which structure is characterized by a predominance of the anhydrous allomorph of said polysaccharide, whereas with other known techniques it is the hydrated allomorph that is predominant.

It is possible to attempt to explain this predominance of the anhydrous allomorph by assuming that the presence of the polyalcohol in the extrudable solution would induce, during the neutralization, particularly hydrophobic conditions resulting in a gradual coagulation of partially dehydrated macromolecules. The polyalcohol would act as a hydrophobic agent which would repel the water molecules during the formation of the gel. On the contrary in the known techniques, the extrudable solution would be free of such a hydrophobic agent so that the coagulation would take place in the presence of highly hydrated macromolecules. The neutralization step according to the invention makes it possible to favor the interactions between the macromolecules and the development of the crystallinity. The polyalcohol according to the invention has a role of a dehydrating agent and of an agent for bridging between the chains in the amorphous phase.

One additional, non-exhaustive, explanation would be that on a scale larger than that of the polymer crystals (several nm to several hundreds of nm), the presence of the polyalcohol influences the formation of nanoparticles or aggregates, of several hundreds of nanometers, of polymer crystals, the percolation of which results in the macroscopic gel. The formation of the gel is a phase separation phenomenon. The presence of the polyalcohol orients the separation toward a spinodal decomposition mechanism, whereas more hydrophilic conditions lead to a mechanism of nucleation and growth. Thus, the mean size of the aggregates resulting from the phase separation by spinodal decomposition, in the presence of the polyalcohol, is significantly smaller than under exclusively hydrophilic conditions, as in the known techniques. The aggregates remain more entangled when they are formed by spinodal decomposition.

This advantageously results, after neutralization of an aqueous-alcoholic collodion, in a semi-crystalline gel having improved mechanical properties, facilitating subsequent drawing operations, which intrinsically further favor the crystallization. Furthermore, depending on the washing times applied, the presence of residual alcohol, which acts as an agent for bridging between the chains, also helps to increase the mechanical properties.

Moreover, in the method of the present invention, the formation of the anhydrous allomorph does not take place at the expense of the molar mass of the polysaccharide, unlike what occurs using known techniques, in particular the technique of post-curing at a temperature of about 240° C., as mentioned by Ogawa, K., *Effect of heating an aqueous suspension of chitosan on the crystallinity and polymorphs*, Agricultural and Biological Chemistry, 1991, Vol. 55 (No. 9) pp. 2375-2379.

The latter technique certainly makes it possible to obtain the formation of an anhydrous allomorph but this is at the expense of the final molar mass and therefore of the mechanical properties.

Thus, the weight-average molar mass of the polysaccharide of the elongate element obtained is substantially maintained close to its initial value in the polysaccharide that was used for the preparation of the extrudable solution.

Preferably, since the polysaccharide used for preparing the extrudable solution has a weight-average molar mass $Mw0$, the polysaccharide in the elongate element obtained has a weight-average molar mass $Mw1$ which is between $Mw0$ and $0.7\ Mw0$, preferably between $Mw0$ and $0.8\ Mw0$.

The initial mean weight-average molar mass of the chitosan in the extrudable solution used within the context of the present invention is, advantageously, between 150 000 and 650 000 g/mol, preferably between 450 000 and 650 000 g/mol.

The apparent viscosity of the aqueous-alcoholic solution according to the invention is, in general, between 250 Pa·s and 2500 Pa·s.

For example, regarding a chitosan yarn obtained by the method of the present invention, the weight-average molar mass of the chitosan in said yarn is greater than 350 000 g/mol. Of course, in order to obtain this value it is advisable to start from an initial chitosan, for forming the extrudable solution, which has a weight-average molar mass of greater than 350 000 g/mol, in particular of the order of 400 000 g/mol or more.

The weight-average molar masses indicated in the present text were determined by the measurement technique described in the following publication: A. MONTEMBAULT, C. VITON, A. DOMARD, *Physico-chemical studies of the gelation of chitosan in a hydroalcoholic medium*, Biomaterials, 26(8), 933-943, 2005.

This double characteristic, of a fraction of anhydrous allomorph, in particular of chitosan, greater than or equal to 40%, preferably greater than or equal to 50%, corresponding to the crystalline structure, and of a substantially preserved molar mass, means that the elongate element of the invention has high mechanical properties, in particular in terms of tensile strength, compared to an element of the same starting polysaccharide, produced by another technique, which has a predominantly hydrated allomorph crystalline structure and the macromolecular chains of which have been degraded.

It should be noted that the proportion of polyalcohol relative to water in the aqueous-alcoholic extrudable solution that makes it possible to obtain predominantly the anhydrous allomorph in the crystalline structure of the elongate element obtained is a function of the operating conditions, in particular the choice of the polysaccharide and its concentration in the solution, the choice of the polyalcohol and the conditions of the optional drawing operation.

Preferably, the aqueous-alcoholic solution contains, by weight, from 0.8% to 3.5% of polysaccharide, especially of chitosan, in particular for a chitosan having a weight-average molar mass $Mw0$ greater than or equal to 400 000 g/mol, and a water/polyalcohol ratio in which the proportion by weight of water is less than or equal to 50% and the proportion by weight of polyalcohol is greater than or equal to 50%, preferably the proportion by weight of polyalcohol is greater than or equal to 55%.

It was observed that by increasing the proportion of polyalcohol in the extrudable solution, an increase of the fraction of anhydrous allomorph in the elongate element obtained, which may range up to 100%, is correspondingly obtained.

Preferably, the operation of coagulating by neutralization is followed by a washing operation so as to eliminate the salts formed and optionally the residual polyalcohol.

The polyalcohol contained in the extruded element is at least partly eliminated during the operation of coagulating by neutralization, when this operation takes place by passing into a bath containing an acidic or basic solution depending on the polysaccharide used, and also during the washing operation.

According to one embodiment variant, the method also comprises a step of drying the elongate polysaccharide element.

Which drying step is carried out in dry hot air when the coagulating operation is carried out in an acidic or basic neutralizing solution.

According to one embodiment, the extrudable solution is an acidic solution and the coagulating operation takes place by passing the extruded solution into a coagulation bath consisting of an alkaline neutralizing bath, for example into 1 mol/l (1M) sodium hydroxide or ammonium hydroxide, in order to obtain the coagulated element, which is then subjected to a washing operation, and then preferably to a drying operation, in particular in hot dry air. The elimination of the polyalcohol takes place during the passage through the coagulation bath and through the washing bath.

According to one embodiment, the extrudable solution is an acidic solution and the coagulating operation takes place by passing the extruded solution into an alkaline neutralizing gas in order to obtain the coagulated element. The elimination of the polyalcohol and of the residual salts is carried out during the washing and drying operation, which drying is preferably in a stream of hot dry air.

The method of the present invention applies to chitosan and to many other polysaccharides, mainly those which are water-soluble and film-forming, and in particular which have β(1→4) glycosidic bonds. Mention may be made of cellulose derivatives, hyaluronic acid, hemicelluloses, alginates and pectins.

As regards more particularly chitosan, the extrudable aqueous-alcoholic solution is preferably obtained starting from chitosan in an aqueous solution of acid, in particular in an acetic acid medium, and by adding the polyalcohol used. The bath for coagulating by neutralization is, preferably, a solution of ammonium hydroxide or of sodium hydroxide; however it could also be neutralization by an alkaline gas, in particular by gaseous ammonia as in document EP 1 670 418.

In order to produce an elongate hyaluronic acid or alginate element, the extrudable solution is obtained starting from hyaluronan or from alginate in aqueous solution at neutral pH and the coagulating operation is carried out in an acidic neutralizing bath.

The elongate element obtained by the method of the invention is preferably a yarn, the extrusion being carried out through a spinning spinneret, either a single spinneret, so as to form a continuous filament, or a multiple spinneret, so as to form a multifilament yarn. In this case, the method comprises a final operation of winding the filament or the multifilament yarn obtained.

However, the method is not limited to spinning, it being possible for the elongate element to be in the form of a profiled element of any cross section, depending on the configuration of the extrusion spinneret. It may in particular be a film or a sheet with a spinneret of rectangular cross section, or else a tube with a spinneret of circular or annular cross section.

As regards more particularly the spinning of a polysaccharide yarn, the method comprises at least one drawing operation during and/or after the coagulation. Preferably, this drawing takes place at least immediately on exiting the extrusion spinneret.

The present invention will be understood more clearly on reading the description hereinafter of an example of production of a chitosan yarn illustrated with reference to the appended figures.

Figure 1:
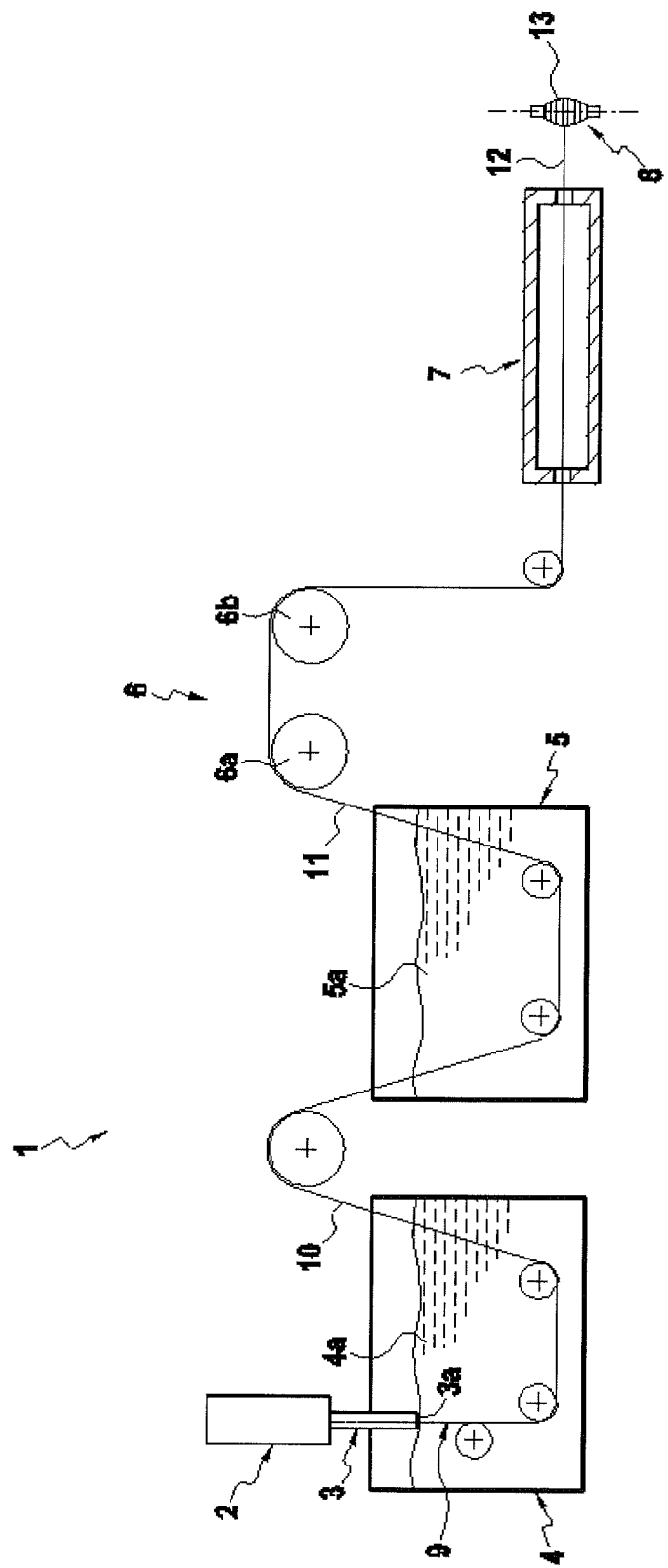
FIG. 1 is a diagrammatic representation of the spinning apparatus.

The apparatus 1 comprises, successively, an extruder 2 and its extrusion spinneret 3, a coagulating unit 4, a washing unit 5, a drawing system 6, a drying unit 7 and a winding unit 8.

This apparatus 1 can enable the production of a yarn, either a continuous filament or a multifilament yarn, depending on whether the extrusion spinneret 3 is a simple spinneret with a single hole or a spinneret comprising a plurality of holes; it can also enable the production of a film that can be wound in the form of a reel, with a spinneret 3 having a narrow rectangular cross section.

If it is a question of extruding a sheet, or any other form (hollow fiber, tube, various profiled elements), that cannot be wound on itself, the apparatus will have to comprise additional means for sequenced cutting and handling for the production of unit sections of said sheet.

The detailed example which will be described hereinafter relates to the production of a chitosan yarn; this example is not limiting with respect to the present invention, it being possible for the latter to relate to the production of any elongate polysaccharide element which is capable of being solubilized in the form of an extrudable aqueous-alcoholic solution and which, in addition, has film-forming properties. Mention may in particular be made of cellulose ethers, such as carboxymethyl cellulose (CMC), hydroxypropyl cellulose (HPC), methyl cellulose (MC), methyl ethyl cellulose (MEC) or hydroxypropyl methyl cellulose (HPMC), cellulose esters and mainly cellulose acetate, hyaluronic acid, certain hemicelluloses, alginates and certain pectins, in particular homogalacturonan.

The aqueous-alcoholic chitosan solution is prepared by dissolving the chitosan in an aqueous solution of acid and by then adding a polyalcohol to this solution. The aqueous solution of acid, preferably acetic acid, is obtained by adding an amount of acid which is stoichiometric with respect to the free amine functions of the dissolved chitosan. The polyalcohol chosen in order to obtain the aqueous-alcoholic chitosan solution is, for example, 1,2-propanediol.

Before being extruded, the aqueous-alcoholic solution is degassed in order to remove the gas bubbles that may be responsible for defects in the yarn obtained.

The aqueous-alcoholic solution should have a viscosity that is sufficient to allow extrusion but not too high, so as not to have degassing times that are too long. For this, a solution is used having a concentration of from 0.8% to 3.5% by weight of chitosan, preferably having a weight-average molar mass $Mw0>400\,000$ g/mol, in a water/polyalcohol mixture in which the proportion by weight of water is less than or equal to 50%, and the proportion by weight of polyalcohol is greater than or equal to 50%, preferably the proportion by weight of polyalcohol is 55%.

In order to obtain the appropriate viscosity with low chitosan concentrations, it is preferable to use a chitosan of high molar mass, for example in the average molar mass $Mw0$ range of from 150 000 to 650 000 g/mol. The aqueous-alcoholic chitosan solution has an apparent viscosity between 250 Pa·s and 2500 Pa·s.

Moreover, the best mechanical properties for the yarn are obtained by using a chitosan for which the degree of acetylation is low, in particular less than 40%, preferably less than 30%. The degree of acetylation (DA) is the percentage of acetylated units relative to the total number of units present on the chitosan chain, i.e. their molar fraction multiplied by 100. It can be determined by Fourier transform infrared spectrometry or preferentially by $^1$H proton NMR spectrometry. The above comment is not limited to the acetylated forms of chitosan; it also relates to all other acylated forms of the primary amine function, in particular ethyl, propyl or butyl chitosan having a low degree of acylation, for example less than 40%.

In a specific exemplary embodiment, the extrudable aqueous-alcoholic chitosan solution was obtained by starting from, as raw material, a chitosan (Mahtani Chitosan) having a degree of acetylation of between 1% and 3% and a high weight-average molar mass of between 450 000 and 600 000 g/mol.

The aqueous-alcoholic solution, having an initial concentration, before degassing, of 2.4% by weight of chitosan, a water/polyalcohol ratio of 40/60% by weight and an apparent viscosity, after degassing, close to 1500 Pa·s, was extruded through a single-hole tube spinneret, the internal cross section of which had a diameter of v0.8 mm. The extrusion was carried out with a throughput of between 3 and 20 ml/h.

As illustrated in FIG. 1, the extruded solution 9, leaving the downstream end 3a of the extrusion spinneret 3, penetrates into the coagulating unit 4 consisting of a tank filled with an alkaline aqueous solution 4a, in particular a solution of ammonium hydroxide, of sodium hydroxide or of potassium hydroxide. The extrusion spinneret 3 is preferably immersed in the alkaline solution 4a or positioned in the vicinity of the surface of the alkaline solution 4a, as represented in FIG. 1, so that the extruded solution, exiting in the form of a liquid jet, is not broken by collodions as soon as drawing is applied at the outlet of the extrusion spinneret 3.

The passage of the extruded solution 9 into this alkaline solution gives rise to the coagulation of the chitosan, resulting in the formation of an extruded and coagulated yarn 10 and in the at least partial elimination of the polyalcohol contained in the extruded solution 9. This yarn 10, on leaving the coagulating unit 4, then passes into the washing unit 5 that consists of a tank filled with water 5a. The purpose of this washing is to eliminate the excess base and the salts formed, for example the ammonium acetate, sodium acetate or potassium acetate, depending on the composition of the alkaline solution, optionally sodium chloride in the case where the extrudable aqueous-alcoholic solution contains hydrochloric acid and the neutralization contains a solution of sodium hydroxide. During this washing operation, the possible traces of residual polyalcohol are definitively eliminated.

The extruded, coagulated and washed yarn 11, obtained at the outlet of the washing unit 5, subsequently passes into the drying unit 7 consisting of a chamber through which a stream of hot air passes at a temperature of about 100 to 110° C. The chitosan yarn 12 leaving the drying stage is wound in the form of a reel 13 in the final winding unit 8.

It is possible to provide one or more additional washing operations after the drying of the yarn 12 in order to eliminate the polyalcohol, the excess base and the salts formed if the washing time in the washing unit 5 in the apparatus 1 is not sufficient.

The apparatus 1 may also comprise drawing systems: one placed at the spinneret outlet after evaporation of the water, another, represented and denoted by 6 in FIG. 1, between the washing unit 5 and the drying unit 7. These drawing systems are composed of two rolls, for example 6a and 6b, around which the respectively coagulated and washed yarn 11 makes several turns, the downstream roll 6b being driven at a linear speed greater than that of the upstream roll 6a. The purpose of this drawing is to improve the mechanical characteristics of the yarn 12. More generally, this drawing can be carried out during and/or after the coagulating operation, before, during and/or after the washing operation, or even optionally during the drying operation, by means of just one or of several drawing systems.

The polyalcohol that was contained in the extruded solution was eliminated during the coagulating and washing operations, such that the yarn 12 obtained now contains substantially no polyalcohol which has a notable influence on its structure.

It is known that, like many natural polymers, chitosan is a semi-crystalline polymer which has several crystalline forms, the main two of which correspond to the hydrated and anhydrous allomorphs (Okuyama, K., et al., *Structural diversity of chitosan and its complexes*, Carbohydrate Polymers, 2000, 41(3), pp. 237-247). The hydrated form is the most common polymorph form of chitosan. The crystal unit cell is in this case stabilized by the presence of water molecules allowing the formation of hydrogen bridges. There are a minimum of three water molecules for eight glucosamine units in the unit cell. The anhydrous form of chitosan is, on the other hand, less abundant owing to the high affinity of the polymer with water. It can, however, be obtained by means of post-curing at a temperature of about 240° C., as mentioned by Ogawa, K., *Effect of heating an aqueous suspension of chitosan on the crystallinity and polymorphs*, Agricultural and Biological Chemistry, 1991, Vol. 55 (No. 9) pp. 2375-2379.

Unlike the hydrated allomorph, no water molecule is present within the anhydrous crystal unit cell. The unit cell is then more compact and the mechanical properties are substantially improved. Furthermore, this form is less readily rehydrated upon simple contact with water, and retains good mechanical properties even in an aqueous medium.

A morphological study by X-ray diffraction analysis (synchrotron radiation) has made it possible to demonstrate the generation of the anhydrous crystalline form, predominantly relative to the hydrated crystalline form, during the formation of the chitosan yarn according to the method of the present invention, most particularly but not exclusively by varying the proportion of polyalcohol in the extrudable aqueous-alcoholic solution.

The results of this study are partly represented in FIGS. 2 to 5. These results were obtained by the implementation of the method illustrated in FIG. 1, starting from a collodion containing 2.4% of chitosan by weight in a 40/60 (% w/w) water/1,2-propanediol mixture in an alkaline bath 4a.

Figure 2:
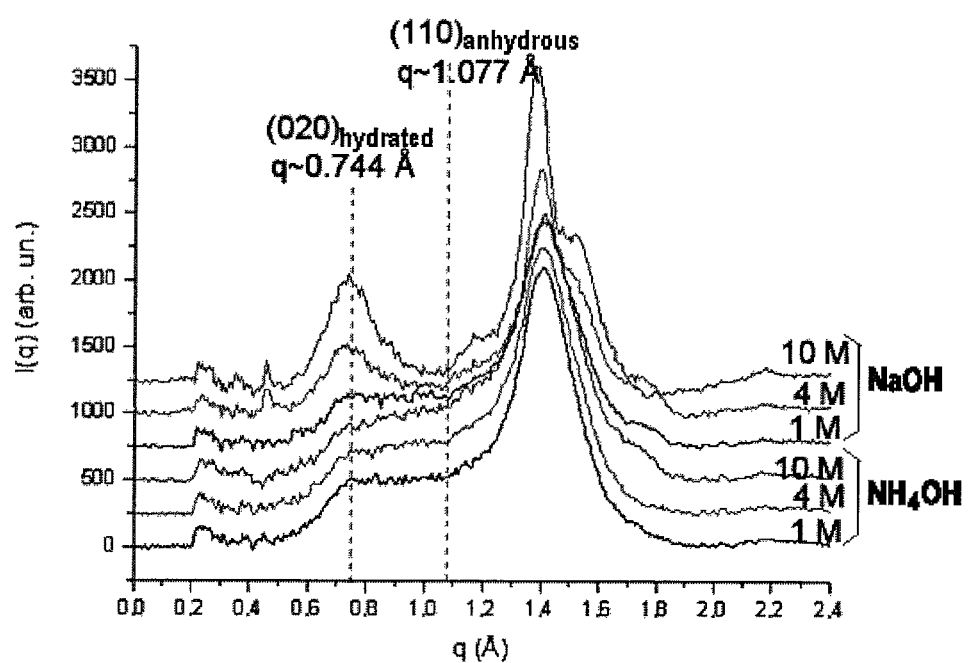
FIG. 2 is a graph representing the influence of the neutralizing conditions on the formation of the anhydrous allomorph relative to the formation of the hydrated allomorph.

FIG. 2 illustrates the influence of the nature of the base, in this specific example ammonium hydroxide or sodium hydroxide, and of its concentration in the alkaline bath 4a on the composition of allomorphs in the chitosan yarn 12. The results differ depending on the nature of the base. Indeed, when the base is ammonium hydroxide, regardless of its concentration in the alkaline bath 4a, the predominant formation of anhydrous allomorphs is obtained. When the neutralization is carried out in sodium hydroxide, the effect of the concentration of this base has, on the other hand, an influence on the fraction of anhydrous allomorphs obtained. Thus, when the sodium hydroxide concentration is 1 mol/liter (1M), the predominant form is the anhydrous allomorph, whereas when the sodium hydroxide concentration is greater than 4M, the predominant form is the hydrated allomorph.

Figure 3A:
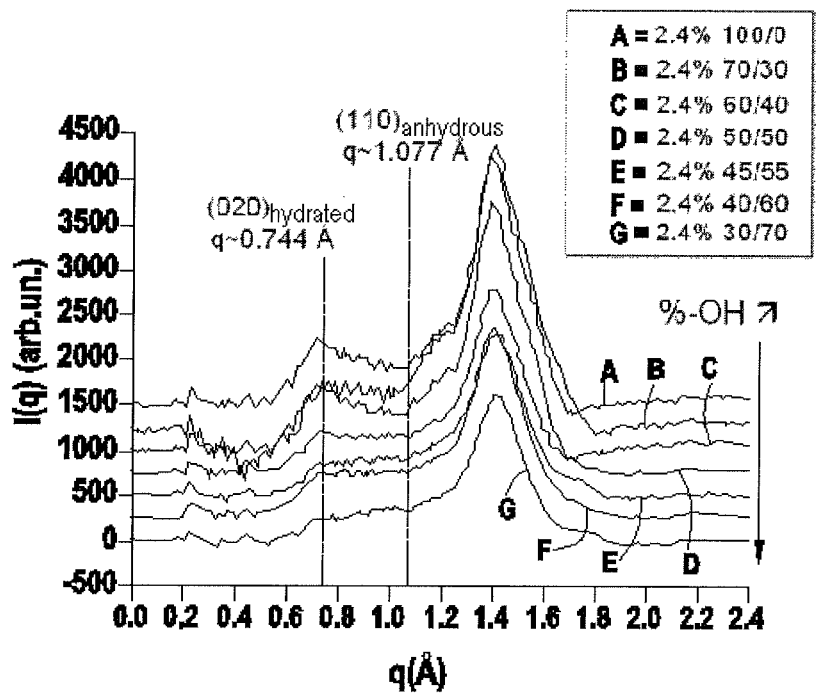
FIGS. 3A and 3B are graphs representing the influence of the proportion of the polyalcohol relative to the water in the water/polyalcohol solvent constituting the collodion on the formation of the anhydrous allomorph relative to the formation of the hydrated allomorph.
Figure 3B:
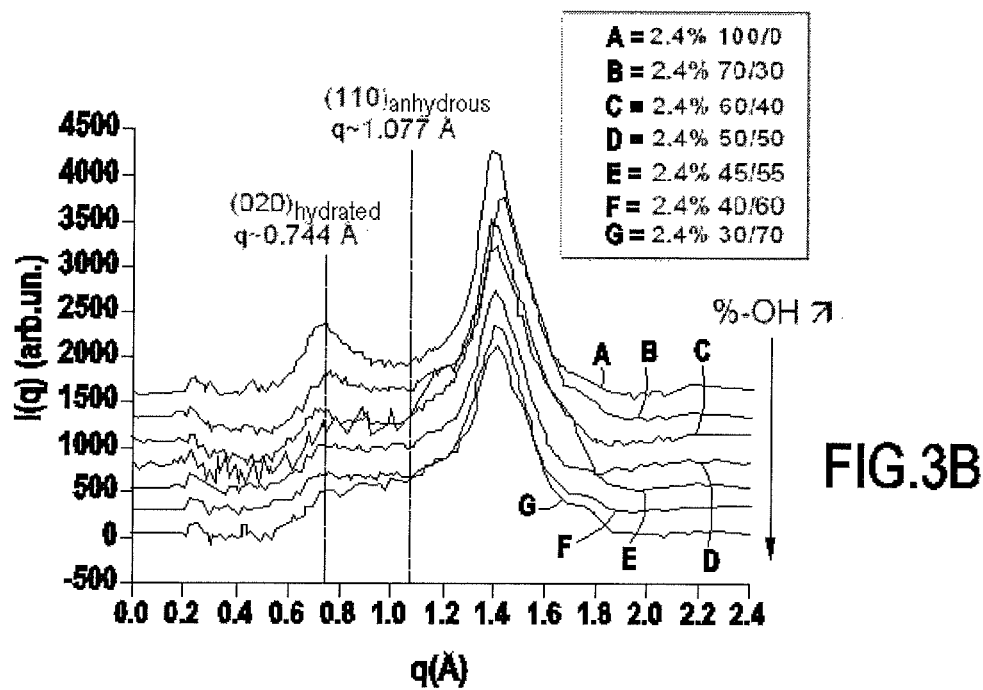

FIGS. 3A and 3B illustrate the influence of the water/polyalcohol ratio of the mixture in which the chitosan is in solution. In FIG. 3A, the alkaline bath 4a comprises an ammonium hydroxide concentration of 1M. In FIG. 3B, the alkaline bath comprises a sodium hydroxide concentration of 1M. These graphs demonstrate that when the water/polyalcohol mixture comprises a proportion by weight of water greater than or equal to 60%, a predominant formation of hydrated allomorphs is obtained. When the proportion by weight of polyalcohol is greater than or equal to 50%, in particular greater than or equal to 55%, significant results regarding the predominant formation of anhydrous allomorphs are obtained.

Figure 4:
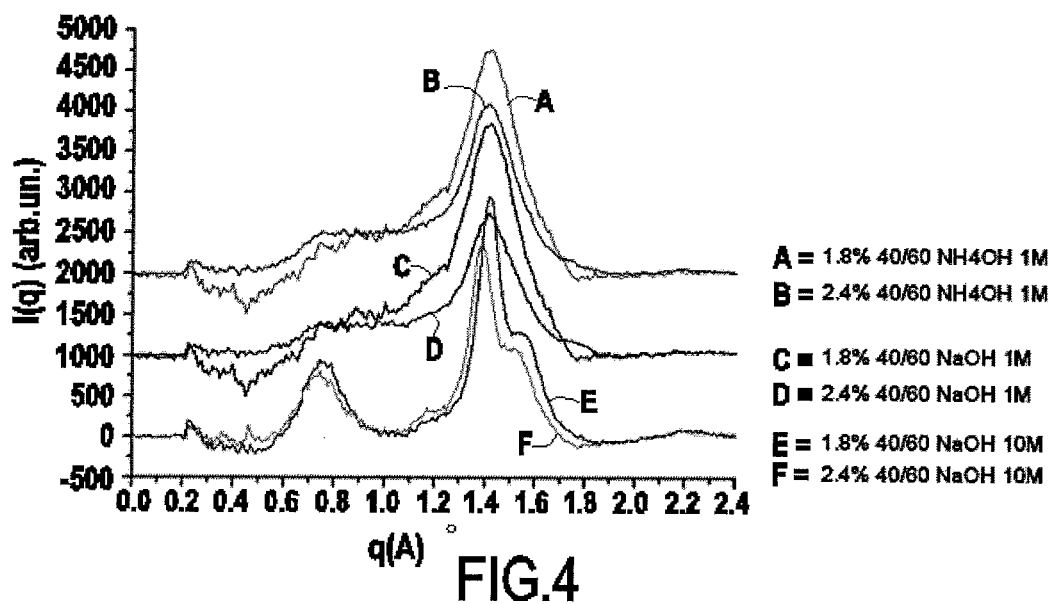
FIG. 4 is a graph representing the influence of the chitosan concentration on the formation of the anhydrous allomorph relative to the formation of the hydrated allomorph for various neutralizing conditions.

FIG. 4 illustrates the influence of the chitosan concentration in a 40/60% by weight water/polyalcohol mixture in an alkaline bath 4a having, for the first two curves, an ammonium hydroxide concentration of 1M and, for the last four curves, a sodium hydroxide concentration of 1M and of 10M for concentrations by weight of chitosan in said mixture of 1.8% and of 2.4%.

It emerges that the chitosan concentration has little influence on the formation of anhydrous allomorphs between 1.8% and 2.4%.

It emerges from this study that after coagulation by neutralization, the WAXS (wide angle X-ray scattering) images reveal orientated crystalline systems, which demonstrates the importance of the neutralizing step in the development of the crystallinity. In addition, the crystals formed are orientated in a preferential direction, the axis of the macromolecular chains corresponding to the axis of the yarn. Moreover, the analysis of the diffraction rings makes it possible to note that anhydrous crystals or a mixture of anhydrous and hydrated crystals, the anhydrous crystals being predominant in this mixture, are generated in the yarn.

A comparative test was carried out with chitosan yarns A and B obtained, for the first ones A, according to the wet spinning technique mentioned above (Journal of Applied Polymer Science, 1993, 50 (10), 1773-9) and, for the second ones B, with the method of the present invention, starting from similar chitosan solutions, except for the fact that, for the first ones A, the solution is strictly aqueous, whereas, for the second ones B, it is aqueous-alcoholic, containing 1,2-propanediol. The test was carried out with the yarns A and B in the dry state.

Figure 5:
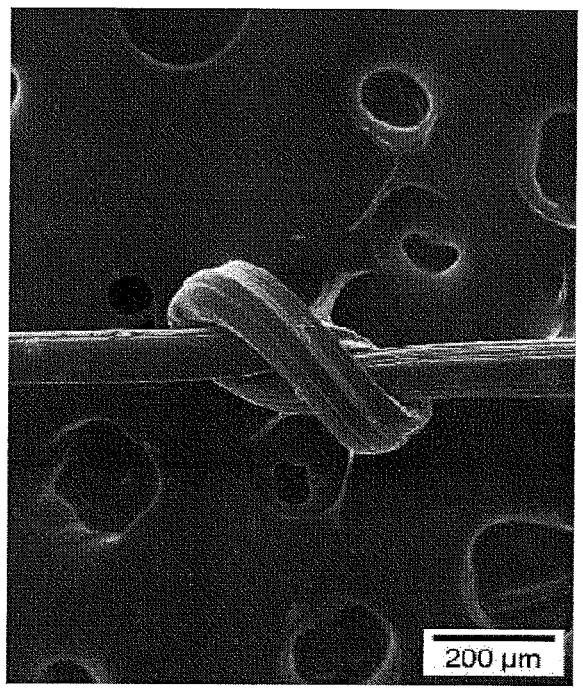
FIG. 5 is a photograph, taking with an electron microscope, of a knot formed on a chitosan yarn of the invention.

FIG. 5 illustrates the result obtained. Specifically, it is impossible to tie an overhand knot with the yarn A without it breaking, whereas the yarn B withstands the formation of an overhand knot, which was able to be photographed in FIG. 5.

The test of the knot strength is carried out on a tensile testing machine equipped with a 10 N Adamel-Lhomargy sensor. The yarn B studied is held between two clamps or jaws that put in under tension in a device having jaws specific to elongate elements, in particular yarns. An overhand knot is arranged on the yarn B so that, once the yarn B is held between the two jaws, it is equidistant from said jaws. The overhand knot is tied loosely so that the operator exerts no tension on the latter other than the tension imparted during the test. The ends of the yarn B are rolled up three times level with said jaws having a half-moon shape before being clamped in the latter, in order to prevent any slippage during the tensile test. The length of the yarn B put under stress between the two jaws is 3 cm. For a draw ratio of 1.30 (corresponding to the ratio of the linear extrusion speed of the extruded solution 9 to the drawing speed, on leaving the coagulating step 4, of the extruded and coagulated yarn 10), the count of the yarn B being of the order of 103 dtex±1, the knot strength is 37 MPa±4. When the draw ratio is 1.54, the count of the yarn B being 85 dtex 1, the knot strength is then 83 MPa±9.

Thus, surprisingly, the chitosan yarn B of the present invention has strength and flexibility properties that enable it to be subjected, without breakage, to the formation upon itself of a knot, including while exerting a certain tension on the two strands facing said knot. This has never, to the applicants' knowledge, been achieved with chitosan yarns obtained by known techniques.

These properties of said single-strand chitosan yarn according to the invention open up new fields of application due to the fact that it can be worked under high-deformation and repeated conditions, for example during the formation of the stitches of a knit fabric. To date, the chitosan yarns obtained by known techniques were used solely in the form of nonwoven fabrics. Advantageously, the single-strand chitosan yarn of the present invention can be knitted or woven.

The elongate element obtained by virtue of the method of the invention, whether it is a single-filament or multifilament yarn, a film or a sheet (or any other form, etc.), can be used alone or in combination with other elements. For example, the yarn may be assembled with one or more other yarns so as to form, for example by throwing or reaming, a composite yarn. For example, the film may be assembled with one or more other films, for example by coating, adhesive bonding or thermal bonding, so as to form a multilayer film. The same is true for the sheet or other form.

The elongate element obtained by virtue of the method of the invention can be used in many applications, wherever the use of a polysaccharide is desired. More particularly, it is intended to participate in the production of materials intended for medical use, concerning in particular textile materials and very particularly materials in knitted form.

Particularly in medical applications, the bioresorption properties of the elongate polysaccharide element obtained by means of the method of the invention may be desired. It should be noted, in this regard, that the predominant presence of the anhydrous allomorph makes it possible to increase the resorption time thereof in vivo. The controlled formation of this anhydrous allomorph, in particular by varying the proportion of polyalcohol in the extrudable solution, makes it possible to adjust the resorption time that may be desired case by case. The same is true during the assembling of the elongate element of the invention having this anhydrous allomorph with other elements, as mentioned above. Furthermore, as regards a chitosan element, it is also possible to vary the degree of acetylation of the chitosan used to form the aqueous-alcoholic solution in order to adjust the resorption time of said element.

It should be noted that the elimination of the polyalcohol contained in the coagulated element may also be obtained by complete evaporation of said polyalcohol, in particular when the coagulation is carried out using an alkaline gas.

We claim:

1. A chitosan yarn characterized in that it comprises a fraction of the anhydrous allomorph of chitosan of greater than or equal to 40%, corresponding to the crystalline structure.

2. The chitosan yarn as claimed in claim 1, characterized in that it has mechanical strength and flexibility properties that enable it to be subjected, without breaking, to the formation of an overhand knot upon itself.

3. The chitosan yarn as claimed in claim 1, characterized in that the weight-average molar mass Mw1 of the chitosan is greater than 350 000 g/mol.

4. A textile material comprising chitosan yarns, as claimed in claim 1, alone or assembled with other yarns.

5. The chitosan yarn as claimed in claim 1, characterized in that it comprises a fraction of the anhydrous allomorph of chitosan of greater than or equal to 50%, corresponding to the crystalline structure.

6. The textile material of claim 4, characterized in that it is a knit fabric.

* * * * *